US012792774B2

(12) United States Patent
He et al.

(10) Patent No.: US 12,792,774 B2
(45) Date of Patent: Nov. 10, 2026

(54) METHOD, ELECTRONIC APPARATUS AND NON-TRANSITORY COMPUTER READABLE MEDIUM FOR MASKING DATA ON ELECTRONIC DOCUMENT

(71) Applicant: KDAN MOBILE SOFTWARE LTD., Tainan City (TW)

(72) Inventors: Kang-Hua He, Tainan City (TW); Yu-Chi Chen, Tainan City (TW); Chia-Ting Lee, Tainan City (TW); Wen-Wei Lin, Tainan City (TW); Ching-Yi Chiang, Tainan City (TW); Hsin-Yu Huang, Tainan City (TW); Chun-Chin Su, Tainan City (TW); Po-Chou Su, Tainan City (TW); Sin-Jie Wang, Tainan City (TW); Tso-Kuan Lee, Tainan City (TW); Kai-Lin Shih, Tainan City (TW)

( * ) Notice: Subject to any disclaimer, the term of this patent is extended or adjusted under 35 U.S.C. 154(b) by 60 days.

(21) Appl. No.: 18/749,672

(22) Filed: Jun. 21, 2024

(65) Prior Publication Data

US 2024/0427935 A1 Dec. 26, 2024

Related U.S. Application Data

(60) Provisional application No. 63/522,245, filed on Jun. 21, 2023.

(51) Int. Cl.
*G06F 21/62* (2013.01)
*G06F 40/166* (2020.01)

(52) U.S. Cl.
CPC ...... *G06F 21/6254* (2013.01); *G06F 21/6263* (2013.01); *G06F 40/166* (2020.01)

(58) Field of Classification Search
CPC ............. G06F 21/6245; G06F 21/6254; G06F 21/6263; G06F 40/166
See application file for complete search history.

(56) References Cited

U.S. PATENT DOCUMENTS

2018/0276393 A1* 9/2018 Allen .................... G06F 21/602
2022/0309232 A1 9/2022 Kobayashi et al.
2024/0144189 A1* 5/2024 Vann ........................ G06F 40/30
2024/0394466 A1 11/2024 Iimura

FOREIGN PATENT DOCUMENTS

CN 101276363 A 10/2008
CN 110399733 A 11/2019
CN 112396055 A 2/2021
JP 2022152134 A1 10/2022

* cited by examiner

*Primary Examiner* — Olugbenga O Idowu
(74) *Attorney, Agent, or Firm* — OPES IP Consulting Co., Ltd.

(57) ABSTRACT

The present disclosure provides a method and an electronic apparatus for masking data on an electronic document. The method is performed by the electronic apparatus and includes: displaying the electronic document on a user interface; causing at least one analysis module to perform at least one analysis on the electronic document and a plurality of strings of the electronic document and output a first string among the plurality of strings and first position information associated with the first string according to a result of the at least one analysis; obtaining the first string and the first position information from the at least one analysis module; and generating, based on the first position information and the first string, a first masking object to mask the first string on the electronic document.

18 Claims, 12 Drawing Sheets

METHOD, ELECTRONIC APPARATUS AND NON-TRANSITORY COMPUTER READABLE MEDIUM FOR MASKING DATA ON ELECTRONIC DOCUMENT

CROSS-REFERENCE TO RELATED APPLICATION

The present disclosure claims the benefit of and priority to U.S. provisional Patent Application Ser. No. 63/522,245 filed on Jun. 21, 2023, entitled "METHODS AND SYSTEMS FOR ARTIFICIAL INTELLIGENCE-ASSISTED DOCUMENT ANNOTATION AND DATA COLLECTION," (hereinafter referred to as "the '245 provisional"). The disclosure of the '245 provisional is hereby incorporated fully by reference into the present disclosure.

FIELD

The present disclosure generally relates to a method for editing an electronic document, and more particularly, to a method, an electronic apparatus, and a non-transitory computer readable medium for masking data on an electronic document.

BACKGROUND

In current business practices, using the Internet to transmit electronic documents has become a daily routine for office workers. However, if electronic documents containing confidential business information or personal information are received by unauthorized individuals, the data may be misused for illegal activities, causing harm to the interests of individuals or companies.

In order to solve the above problems, it is necessary to provide a method for masking data on an electronic document to prevent confidential business information or personal information from being illegally used.

SUMMARY

Accordingly, the present disclosure provides a method for masking data on an electronic document. The method is performed by an electronic apparatus and includes the following steps: displaying the electronic document on a user interface; causing at least one analysis module to perform at least one analysis on the electronic document and a plurality of strings of the electronic document and output a first string among the plurality of strings and first position information associated with the first string according to at least one result of the at least one analysis; obtaining the first string and the first position information from the at least one analysis module; and generating, based on the obtained first position information and the obtained first string, a first masking object to mask at least one portion of the first string on the electronic document.

In an embodiment of the present disclosure, the method further includes: causing the at least one analysis module to output a second string among the plurality of strings and second position information associated with the second string according to the at least one result of the at least one analysis; obtaining the second string and the second position information from the at least one analysis module; and generating, based on the obtained second position information and the obtained second string, a second masking object to mask at least one portion of the second string on the electronic document.

In an embodiment of the present disclosure, the first position information includes at least one first position coordinate to indicate a first position where the first string is located on the electronic document. In addition, the second position information includes at least one second position coordinate to indicate a second position where the second string is located on the electronic document.

In an embodiment of the present disclosure, the first position information further includes a first width value and a first height value for respectively indicating a first width and a first height of the first string on the electronic document. In addition, the second position information further includes a second width value and a second height value for respectively indicating a second width and a second height of the second string on the electronic document.

In an embodiment of the present disclosure, the method further includes: displaying a data type menu on the user interface, wherein the data type menu includes a first option and a second option, and the first option and the second option are respectively associated with a first data type and a second data type; detecting whether at least one of the first option and the second option is selected; and causing the at least one analysis module to perform the at least one analysis based on the first data type and the second data type after detecting that the first option and the second option are selected. In addition, the at least one result of the at least one analysis includes that the first string is determined as the first data type and that the second string is determined as the second data type.

In an embodiment of the present disclosure, the method further includes: displaying a data type list on the user interface after obtaining the first string, the second string, the first position information and the second position information from the at least one analysis module, wherein the data type list includes a first region associated with the first data type and a second region associated with the second data type; and listing, based on the first data type and the second data type, the first string and the second string, respectively, on the first region and the second region.

In an embodiment of the present disclosure, the method further includes: detecting whether the first string listed on the first region is selected; generating, based on the obtained first position information, a first marking object to mark at least one portion of the first string on the electronic document after detecting that the first string listed on the first region is selected; and generating, in response to a first operation event, the first masking object to replace the first marking object.

In an embodiment of the present disclosure, the method further includes recording, in response to a second operation event, the first position information and the second position information in an information file and storing the information file in a database. In addition, the information file is independent from the electronic document.

In an embodiment of the present disclosure, the method further includes: generating, based on the first position information, a first marking object to mark at least one portion of the first string on the electronic document after obtaining the first string, the second string, the first position information and the second position information from the at least one analysis module; detecting whether the first string listed in the first region is selected; and removing the first marking object after the first string listed in the first region is selected.

In an embodiment of the present disclosure, the at least one analysis module is provided in at least one server, and the at least one analysis includes a first analysis and a second analysis.

In an embodiment of the present disclosure, the method further includes: transmitting an analysis request and the electronic document to the at least one server; causing the at least one analysis module to perform, in response to the analysis request, the first analysis on the plurality of strings of the electronic document and output the first string and the second string according to a first result of the first analysis; causing the at least one analysis module to perform, in response to the analysis request, the second analysis on positions where the first string and the second string are located on the electronic document and output the first position information and the second position information according to a second result of the second analysis; and receiving the first string, the second string, the first position information and the second position information from the at least one server to obtain the first string, the second string, the first position information and the second position information.

The disclosure also provides an electronic apparatus for masking data on an electronic document. The electronic apparatus includes a processor, a display and a storage. The display is electrically coupled to the processor. The storage is electrically coupled to the processor and configured to store a plurality of computer-executable instructions. The plurality of computer-executable instructions, when executed by the processor, cause the electronic apparatus to perform the following steps: causing the display to display the electronic document on a user interface; causing at least one analysis module to perform at least one analysis on the electronic document and a plurality of strings of the electronic document and output a first string among the plurality of strings and first position information associated with the first string according to at least one result of the at least one analysis; obtaining the first string and the first position information from the at least one analysis module; and generating, based on the obtained first position information and the obtained first string, a first masking object to mask at least one portion of the first string on the electronic document.

In an embodiment of the present disclosure, the plurality of computer-executable instructions further cause the electronic apparatus to perform the following steps: causing the at least one analysis module to output a second string among the plurality of strings and second position information associated with the second string according to the at least one result of the at least one analysis; obtaining the second string and the second position information from the at least one analysis module; and generating, based on the obtained second position information and the obtained second string, a second masking object to mask at least one portion of the second string on the electronic document.

In an embodiment of the present disclosure, the plurality of computer-executable instructions further cause the electronic apparatus to perform the following steps: causing the display to display a data type menu on the user interface, wherein the data type menu includes a first option and a second option, and the first option and the second option are respectively associated with a first data type and a second data type; detecting whether at least one of the first option and the second option is selected; and causing the at least one analysis module to perform the at least one analysis based on the first data type and the second data type after detecting that the first option and the second option are selected. In addition, the at least one result of the at least one analysis includes that the first string is determined as the first data type and that the second string is determined as the second data type.

In an embodiment of the present disclosure, the plurality of computer-executable instructions further cause the electronic apparatus to perform the following steps: causing the display to display a data type list on the user interface after obtaining the first string, the second string, the first position information and the second position information from the at least one analysis module, wherein the data type list includes a first region associated with the first data type and a second region associated with the second data type; and listing, based on the first data type and the second data type, the first string and the second string, respectively, on the first region and the second region.

In an embodiment of the present disclosure, the plurality of computer-executable instructions further cause the electronic apparatus to perform the following steps: detecting whether the first string listed on the first region is selected; generating, based on the obtained first position information, a first marking object to mark at least one portion of the first string on the electronic document after detecting that the first string listed on the first region is selected; and generating, in response to a first operation event, the first masking object to replace the first marking object.

In an embodiment of the present disclosure, the plurality of computer-executable instructions further cause the electronic apparatus to perform the following steps: generating, based on the first position information, a first marking object to mark at least one portion of the first string on the electronic document after obtaining the first string, the second string, the first position information and the second position information from the at least one analysis module; detecting whether the first string listed in the first region is selected; and removing the first marking object after the first string listed in the first region is selected.

In an embodiment of the present disclosure, the plurality of computer-executable instructions further cause the electronic apparatus to perform the following steps: transmitting an analysis request and the electronic document to the at least one server; causing the at least one analysis module to perform, in response to the analysis request, the first analysis on the plurality of strings of the electronic document and output the first string and the second string according to a first result of the first analysis; causing the at least one analysis module to perform, in response to the analysis request, the second analysis on positions where the first string and the second string are located on the electronic document and output the first position information and the second position information according to a second result of the second analysis; and receiving the first string, the second string, the first position information and the second position information from the at least one server to obtain the first string, the second string, the first position information and the second position information.

The present disclosure also provides a non-transitory computer readable medium that stores a plurality of computer-executable instructions. The plurality of computer-executable instructions, when executed by one or more one processors, cause an electronic apparatus to perform a method for masking data on an electronic document, and the method includes the following steps: displaying the electronic document on a user interface; causing at least one analysis module to perform at least one analysis on the electronic document and a plurality of strings of the electronic document and output a first string among the plurality of strings and first position information associated with the first string according to at least one result of the at least one analysis; obtaining the first string and the first position information from the at least one analysis module; and generating, based on the obtained first position information and the obtained first string, a first masking object to mask at least one portion of the first string on the electronic document.

BRIEF DESCRIPTION OF THE DRAWINGS

In order to make the above and other objects, features, advantages and embodiments of the present disclosure more readily understood, the accompanying drawings are described as follows.

DETAILED DESCRIPTION OF THE PREFERRED EMBODIMENTS

In the present disclosure, "a," "an," and "the" may refer to a singular form or a plural form, unless an article is specifically restricted to be a singular form in the context.

In addition, as used herein, the terms "comprise/comprising," "include/including," "have/having," and the like are open-ended terms that imply the inclusion of the disclosed features, elements and/or components, but do not preclude the presence or addition of one or more other features, elements, components, and/or groups thereof.

The term "coupled" used in the present disclosure may indicate that two or more elements or devices are in direct physical contact with each other or in indirect physical contact with each other and may also indicate that two or more elements or devices cooperate or interact with each other.

Furthermore, the ordinal terms (such as "first," "second," "third," and the like) used in the present disclosure and claims are used to modify an element itself and do not imply any priority or any order of one element over another element, or do not imply a chronological order of steps of a method performed, but are used only as symbols to distinguish a claimed element having a particular name from another element having the same name.

The spirit of the present disclosure will be clearly illustrated with drawings and detailed descriptions below. After understanding the embodiments of the present disclosure, those skilled in the art with ordinary knowledge can make modifications and variations based on the technologies taught in the present disclosure without departing from the spirit and scope of the present disclosure.

Figure 1:
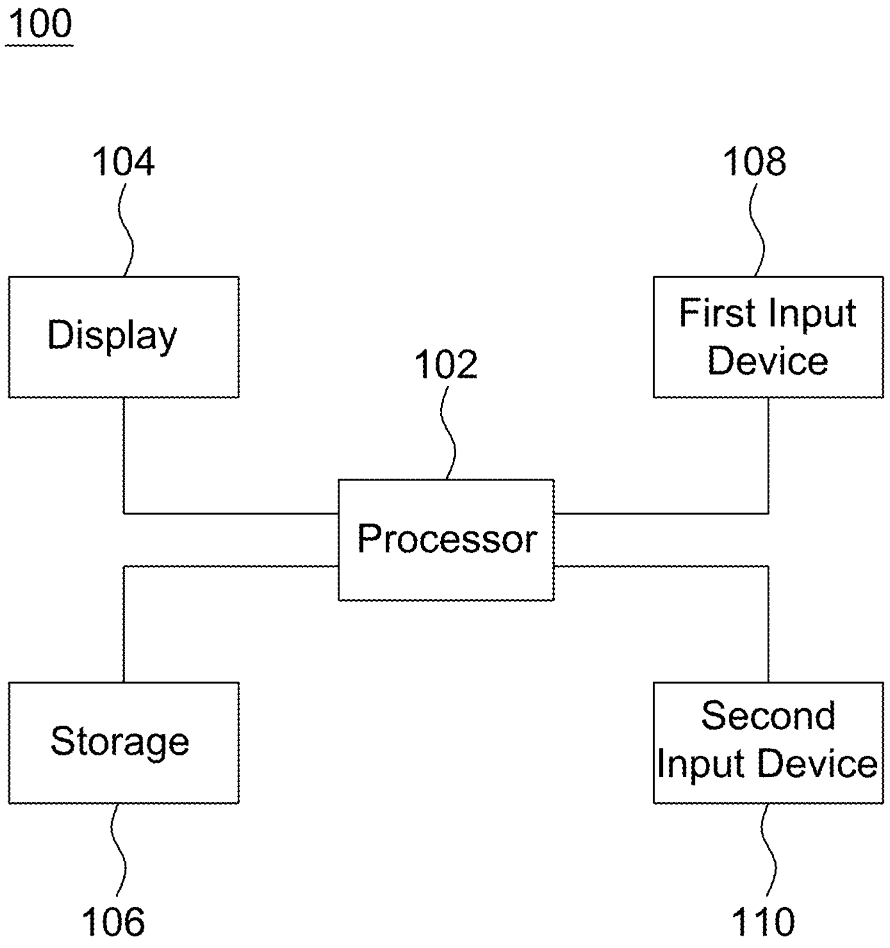
FIG. 1 is a block diagram of an electronic apparatus for masking data on an electronic document according to an embodiment of the present disclosure.

FIG. 1 is a block diagram of an electronic apparatus 100 for masking data on an electronic document according to an embodiment of the present disclosure. The electronic apparatus 100 includes a processor 102, a display 104, a storage 106, a first input device 108 and a second input device 110. The display 104, the storage 106, the first input device 108 and the second input device 110 are respectively electrically coupled to the processor 102. In the present embodiment, the first input device 108 and the second input device 110 may be respectively implemented by, for example, a mouse, a touch screen or a keyboard. The storage 106 is configured to store a plurality of computer-executable instructions, and the plurality of computer-executable instructions, when executed by the processor 102, cause the electronic apparatus 100 to perform the disclosed method for masking data on an electronic document.

Figure 2:
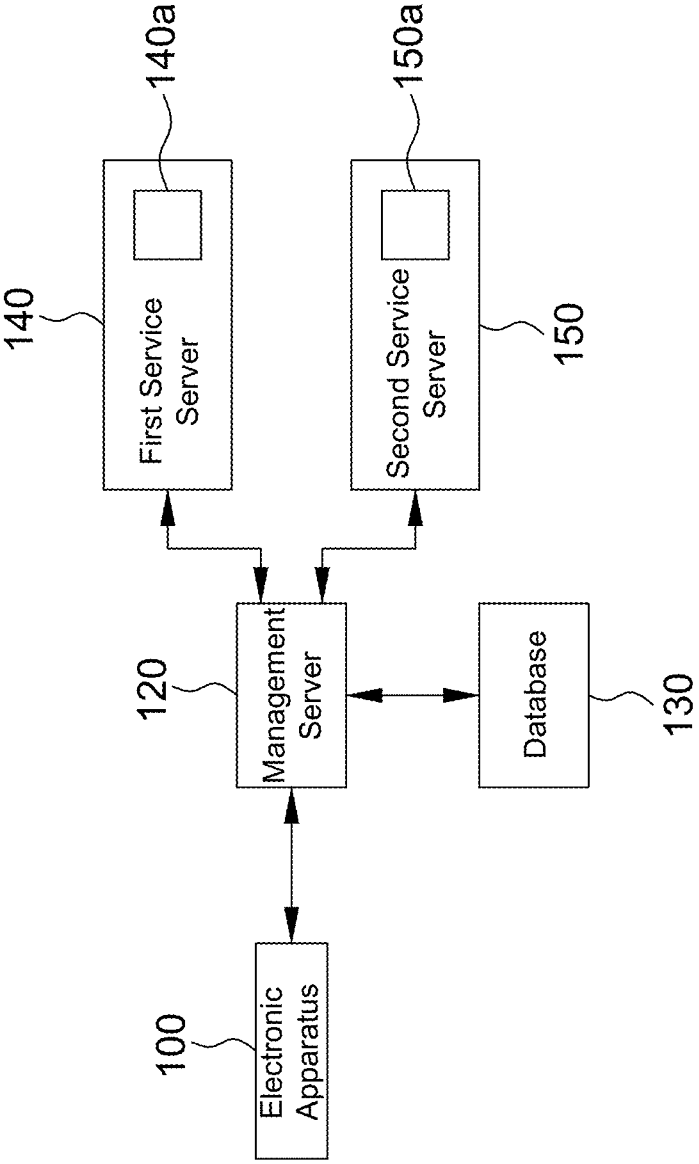
FIG. 2 is a block diagram of a system for masking data on an electronic document according to an embodiment of the present disclosure.

FIG. 2 is a block diagram of a system for masking data on an electronic document according to an embodiment of the present disclosure. Referring to FIG. 2, the system for masking data on an electronic document includes an electronic apparatus 100, a management server 120, a database 130, a first service server 140 and a second service server 150. In the present embodiment, the management server 120, the first service server 140, and the second service server 150 are servers with computing functions and networking functions. The management server 120 and the database 130 may be two independent cloud servers or may be implemented in the same cloud server. The management server 120 is configured to receive an analysis request and an electronic document from the electronic apparatus 100 and generate a first command and a second command according to the analysis request. The management server 120 is configured to transmit the first command to the first service server 140 to instruct the first service server 140 to provide a first document analysis service. The management server 120 is further configured to transmit the second command to the second service server 150 to instruct the second service server 150 to provide a second document analysis service. In the present embodiment, the first document analysis service provided by the first service server 140 may, for example, include performing an analysis on a text content of an electronic document, determining and identifying different types of confidential or sensitive information, e.g., names, birthdays, identity (ID) numbers, phone numbers, or similar information, from the analyzed text content, and finally transmitting the identified confidential or sensitive information back to the management server 120. The second document analysis service provided by the second service server 150 may, for example, include performing an analysis on a position where confidential or sensitive information is located on an electronic document, generating position information of the confidential or sensitive information based on the position being analyzed, and finally transmitting the generated position information back to the management server 120. After the management server 120 receives the confidential or sensitive information from the first service server 140 and receives the position information from the second service server 150, the management server 120 may organize and arrange the received confidential information, sensitive information and position information and transmit the organized and arranged confidential information, sensitive information and position information back to the electronic apparatus 100 in response to the analysis request received from the electronic apparatus 100. In the present embodiment, the first service server 140 and the second service server 150 may be two independent cloud servers or may be implemented in the same cloud server.

In the present embodiment, the first service server 140 includes a first analysis module 140*a* configured to receive a first command from the management server 120, perform a first analysis on an electronic document and/or a text content of the electronic document according to the first command, and then transmit a first analysis result generated by the first analysis back to the management server 120 in response to the first command received from the management server 120. In addition, the second service server 150 includes a second analysis module 150*a* configured to receive a second command from the management server 120, perform a second analysis on a position where the confidential or sensitive information is located on an electronic document according to the second command, and then transmit a second analysis result generated by the second analysis back to the management server 120 in response to the second command received from the management server 120. The services provided by the first service server 140 and the second service server 150 may be, for example, machine learning-based artificial intelligence (AI) analysis services for analyzing a document to automatically and accurately extract texts, keywords, and/or tables and converting the electronic document into useful information. In addition, the first analysis module 140*a* and the second analysis module 150*a* may be different AI models generated by analyzing massive electronic documents through a machine learning technology or a deep learning technology. In an embodiment, the first service server 140 may be, for example, a ChatGPT server, and the first command may be, for example, a ChatGPT command (e.g., a prompt command). In addition, the second service server 150 may be a different type of AI server, such as an Azure server provided by Microsoft, and the service provided by the second service server 150 may be an Azure AI document intelligence service. Further, the management server 120 may have a first application interface (API) and a second API installed thereon and transmit analysis requests and input data (e.g., an electronic document and/or text data of the electronic document) to the first service server 140 and the second service server 150 via the first API and the second API, respectively. In addition, the management server 120 may receive analysis results (e.g., strings or data generated from analyses or position information related to the strings or data) from the first service server 140 and the second service server 150 via the first API and the second API, respectively.

Figure 3A:
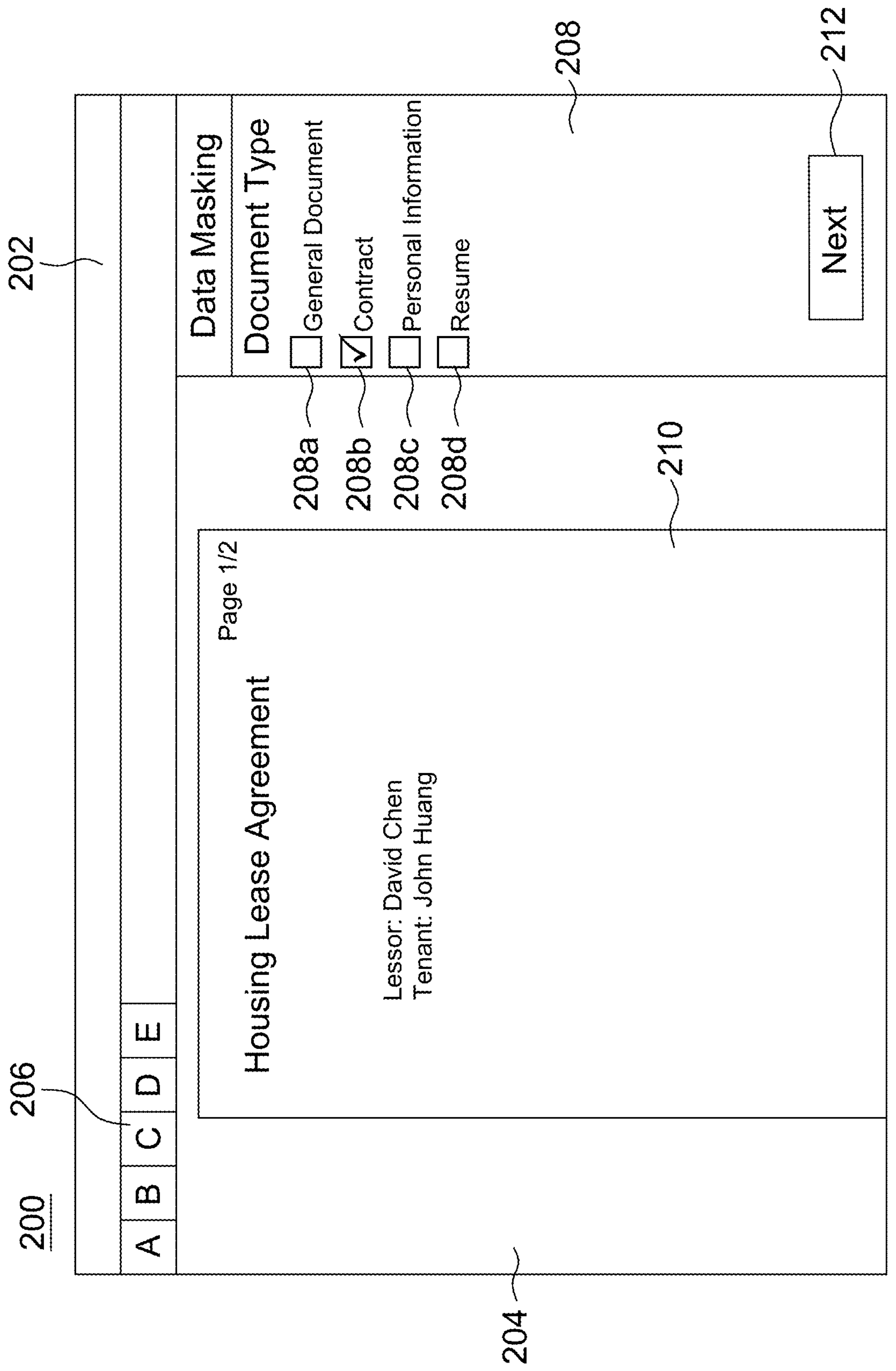
FIG. 3A to FIG. 3I are schematic diagrams of a user interface operating in different states for masking data on an electronic document according to an embodiment of the present disclosure.
Figure 3B:
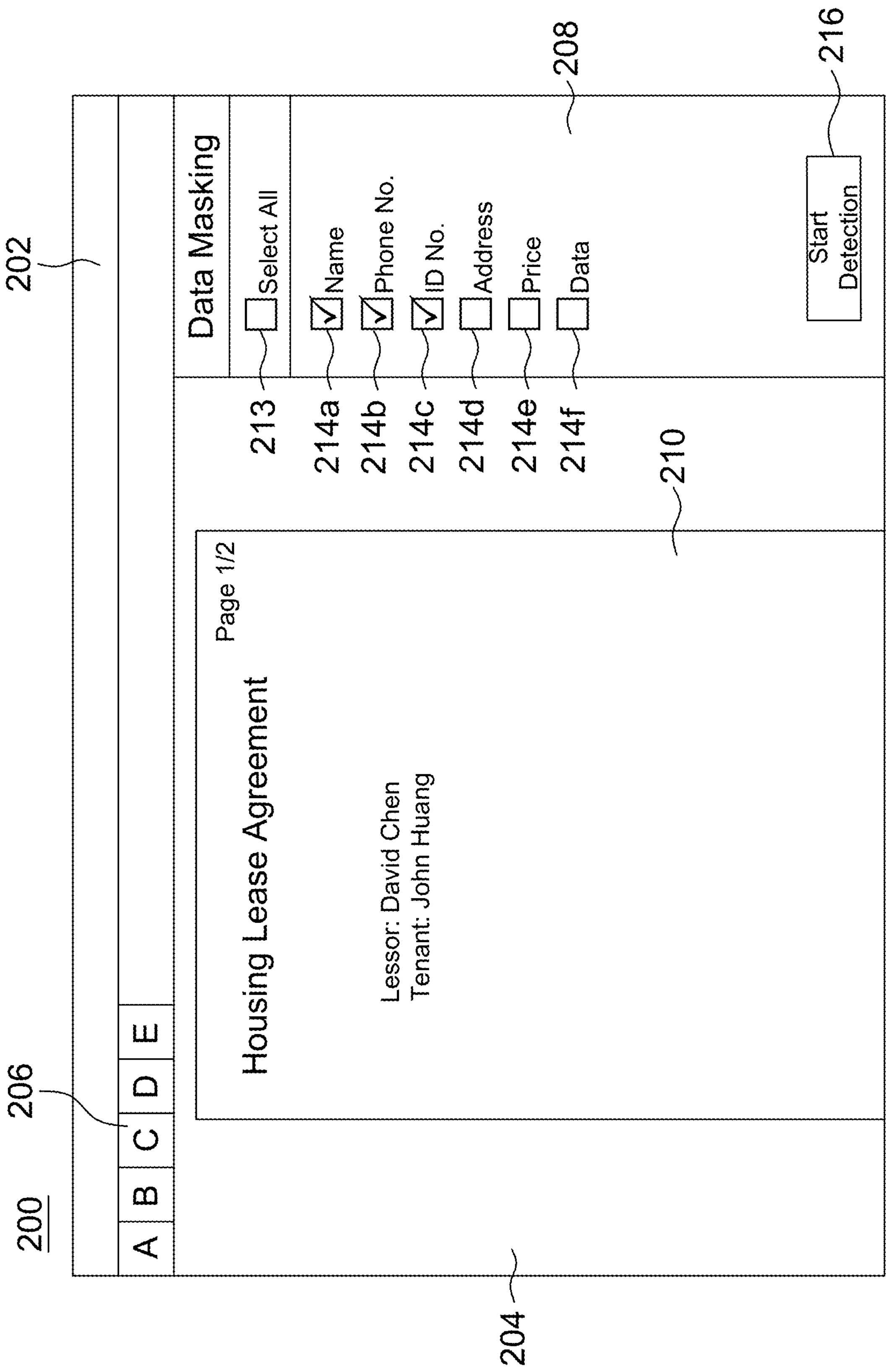

FIG. 3A to FIG. 3I are schematic diagrams of a user interface operating in different states for masking data on an electronic document according to an embodiment of the present disclosure. FIG. 4 is a flowchart for illustrating a method for masking data on an electronic document according to an embodiment of the present disclosure. The method for masking data on an electronic document in the present embodiment may be performed by the electronic apparatus 100. Referring now to FIG. 1, FIG. 3A and FIG. 4, in the step S10, the processor 102 causes the display 104 to display an electronic document 210 on a user interface 200. In the present embodiment, the user interface 200 may be generated by the processor 102 executing a document editing software and includes at least a name region 202, a document editing region 204, a function selection region 206 and an item selection region 208. The name region 202 is configured to display a file name of the electronic document 210. The document editing region 204 is configured to display some or all pages included in the electronic document 210. In the present embodiment, the electronic document 210 is a housing lease agreement, and the page 1/2 of the housing lease agreement includes a plurality of strings "Housing Lease Agreement," "Lessor," "David Chen," "Tenant," and "John Huang." The function selection region 206 includes at least five function options A, B, C, D, and E, but is not limited thereto. In the present embodiment, the function options A, B, C, D, and E may be respectively an "Open File" option, a "Save File" option, a "Merge Pages" option, an "Add Page" option, and a "Mask Data" option. In the present embodiment, the first input device 108 may be a mouse or a touch pad to control a cursor (not shown) displayed on the display 104 and perform operations on the user interface 200. In addition, the second input device 110 may be a keyboard to perform text input and operations on the user interface 200.

In the step S12, the processor 102 may select the function option E "Mask Data" according to the control of the first input device 108 or the second input device 110 and cause the display 104 to display a document type menu on the item selection region 208 of the user interface 200 after the function option E "Mask Data" is selected. In the present embodiment, the document type menu includes a plurality of document type options, such as a "General Document" option 208*a*, a "Contract" option 208*b*, a "Personal Information" option 208*c*, and a "Resume" option 208*d*. When a user would like to mask confidential information or sensitive information in the electronic document 210, the user can use the first input device 108 or the second input device 110 to select, according to the document type of the electronic document 210, the "Contract" option 208*b* and a "Next" button 212, thus causing the processor 102 to select the "Contract" option 208*b* and the "Next" button 212 according to the control of the first input device 108 or the second input device 110. In the present embodiment, when the "Contract" option 208*b* is selected, a "V" will appear in a check box of the "Contract" option 208*b* to indicate that the "Contract" option 208*b* has been selected. After selecting the "Next" button 212, the processor 102 will perform the step S14.

Figure 3C:
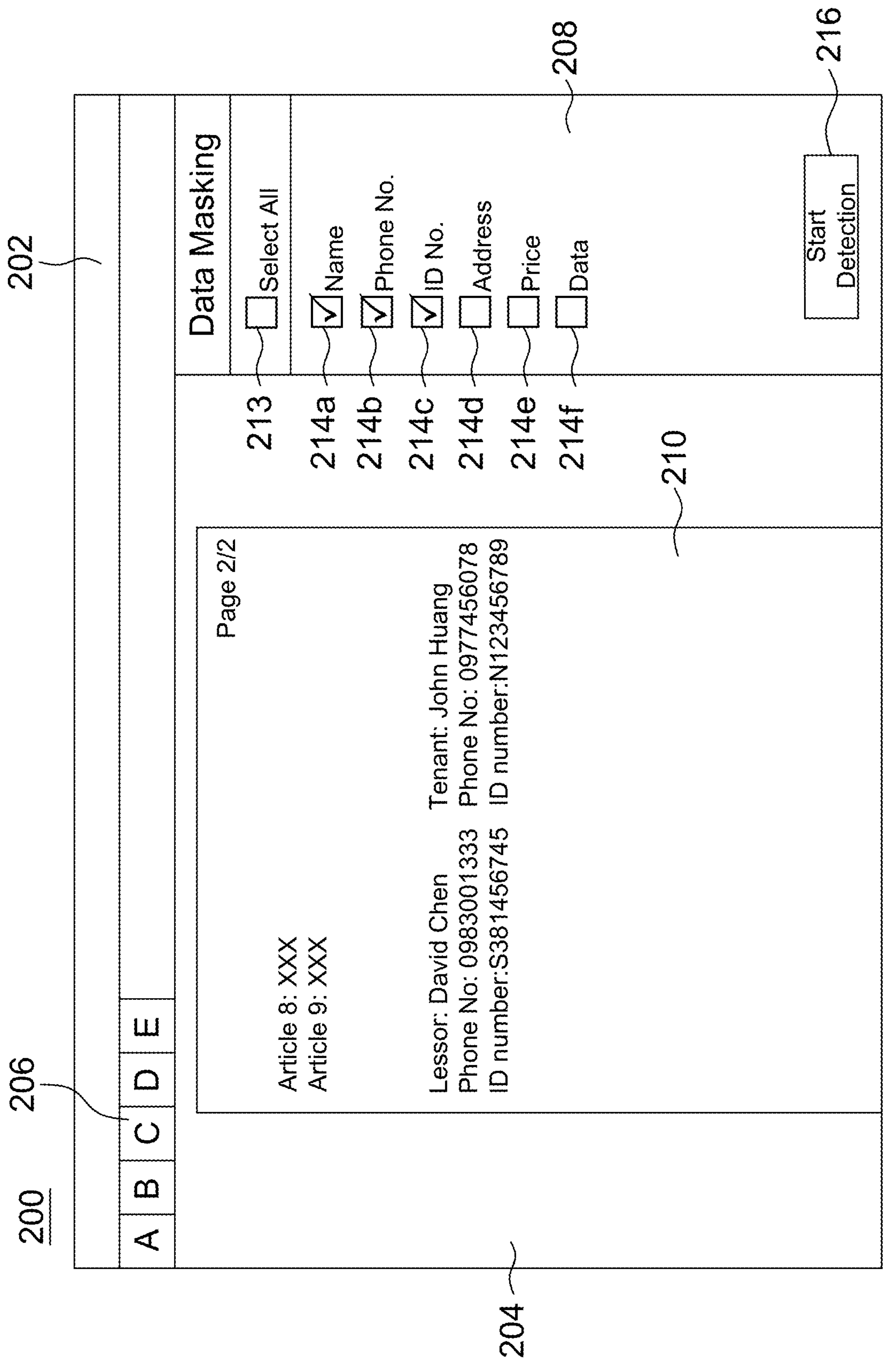
Figure 3D:
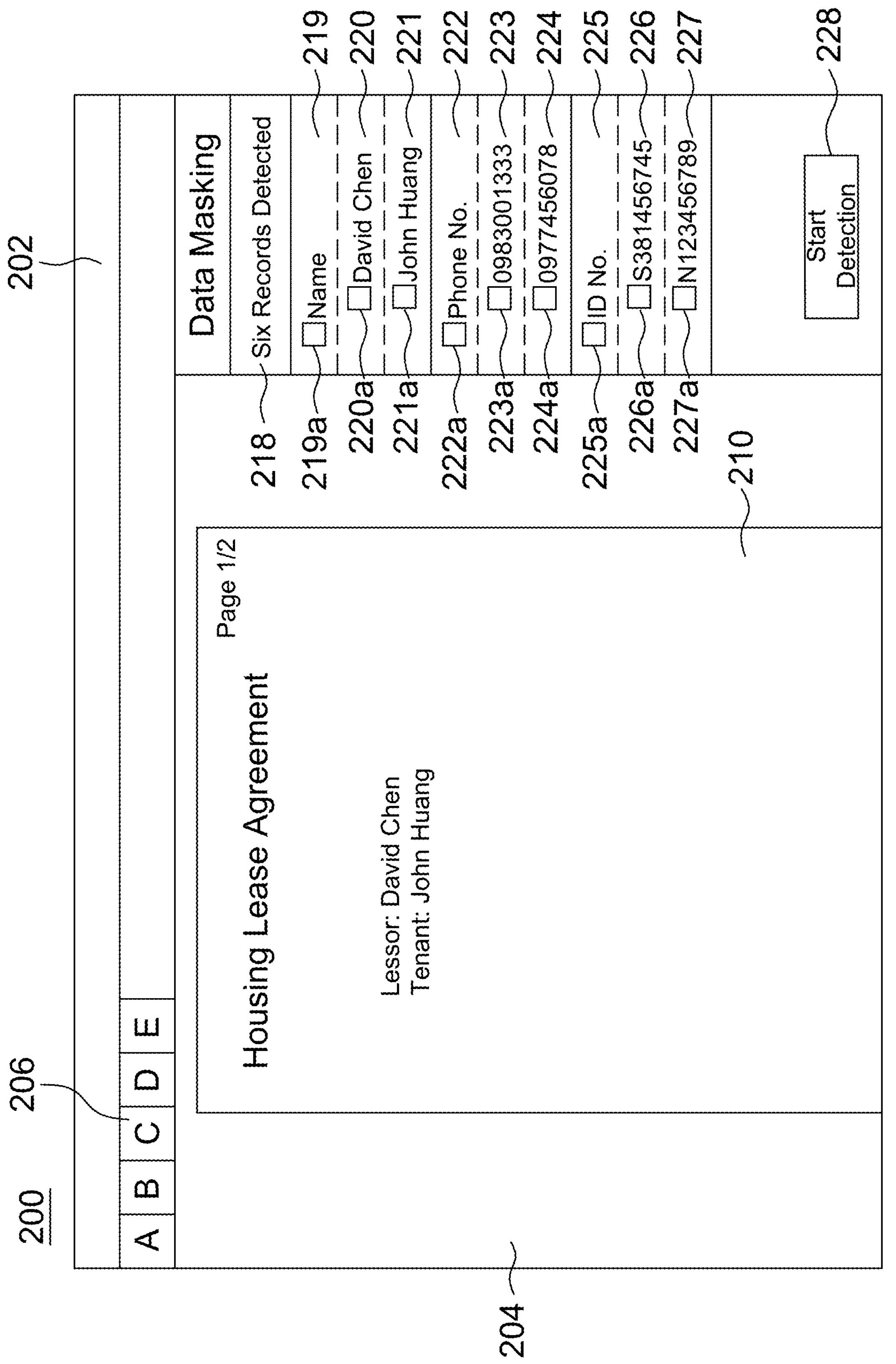
Figure 3E:
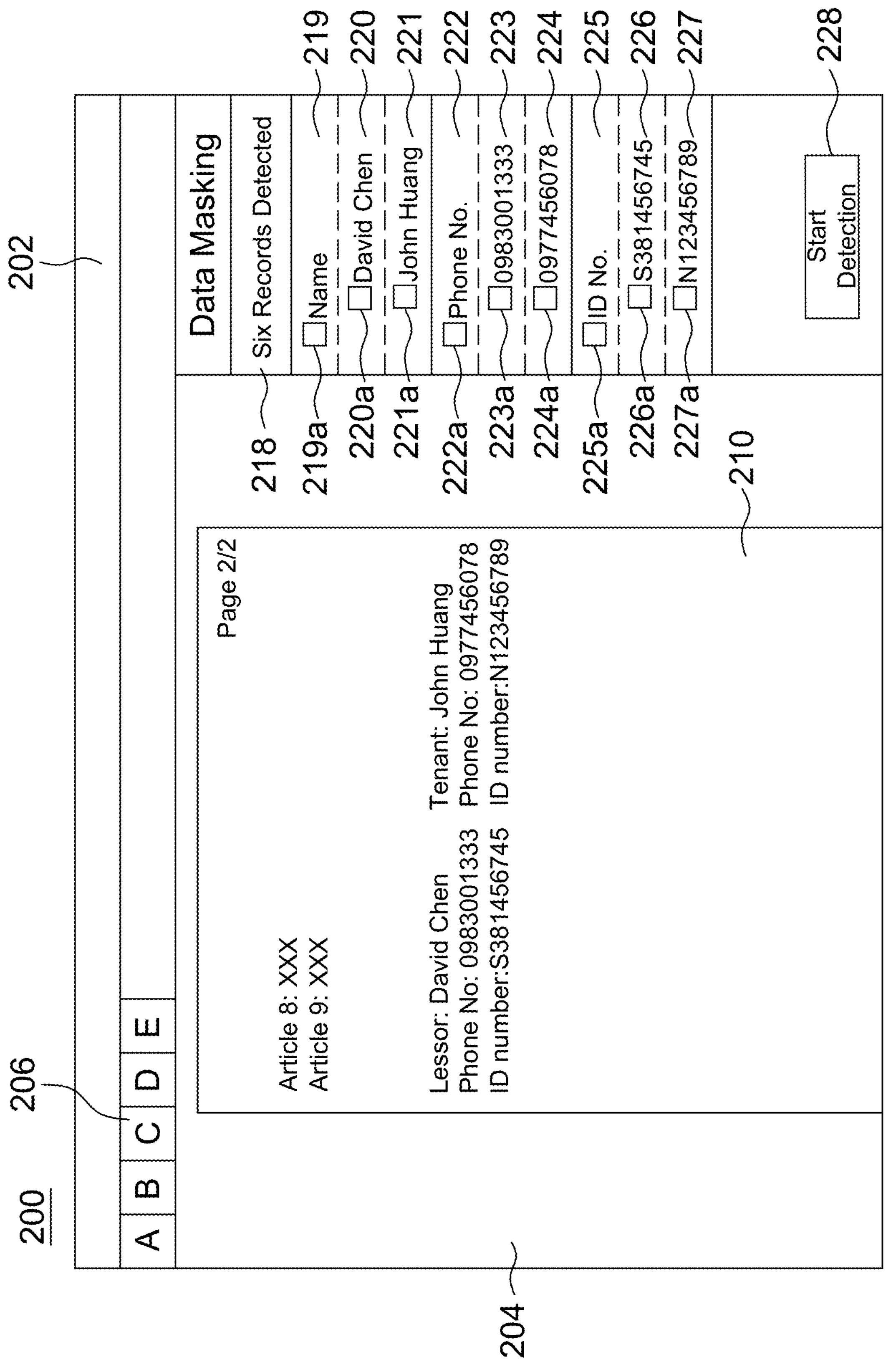
Figure 3F:
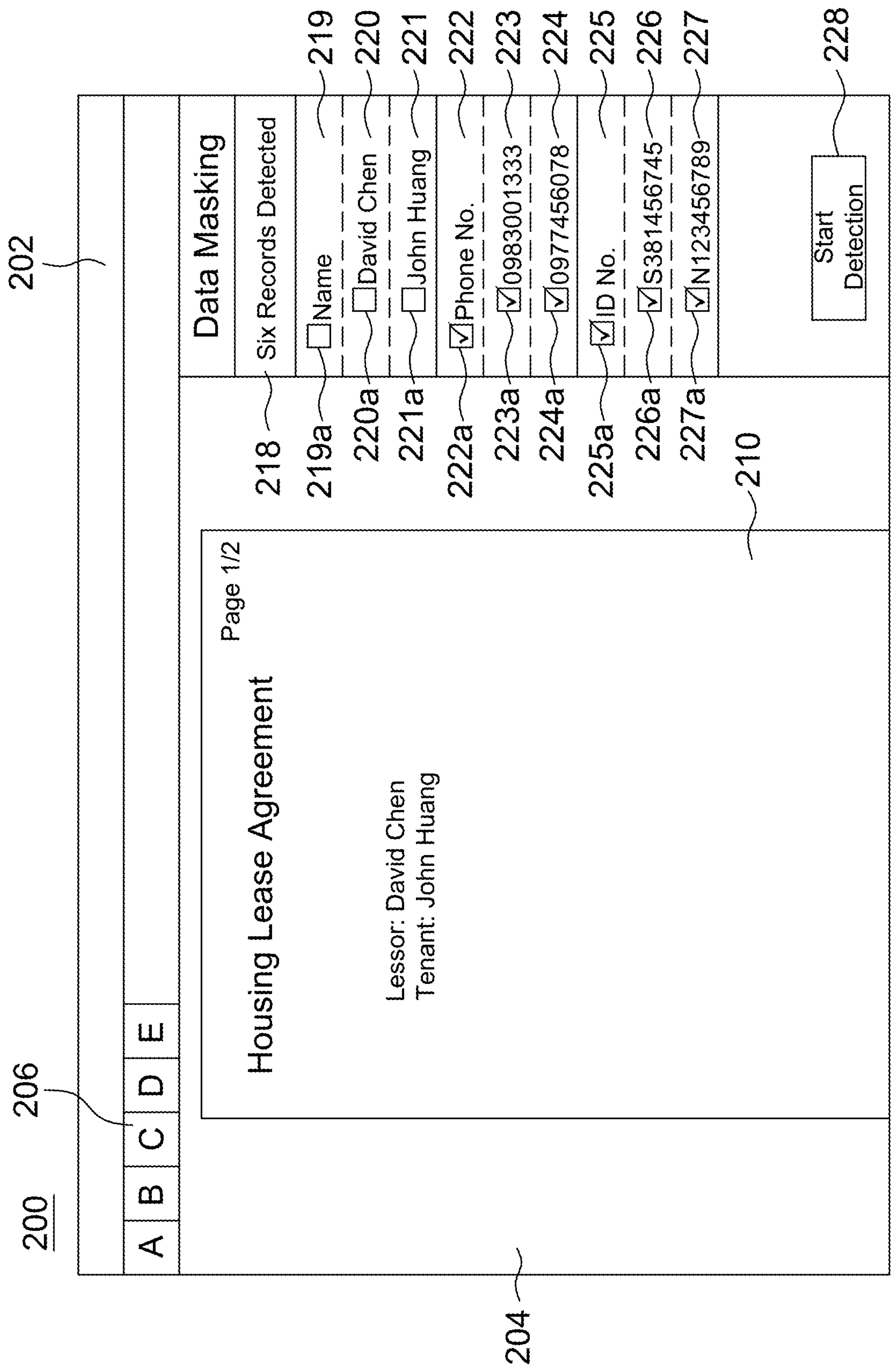
Figure 4:
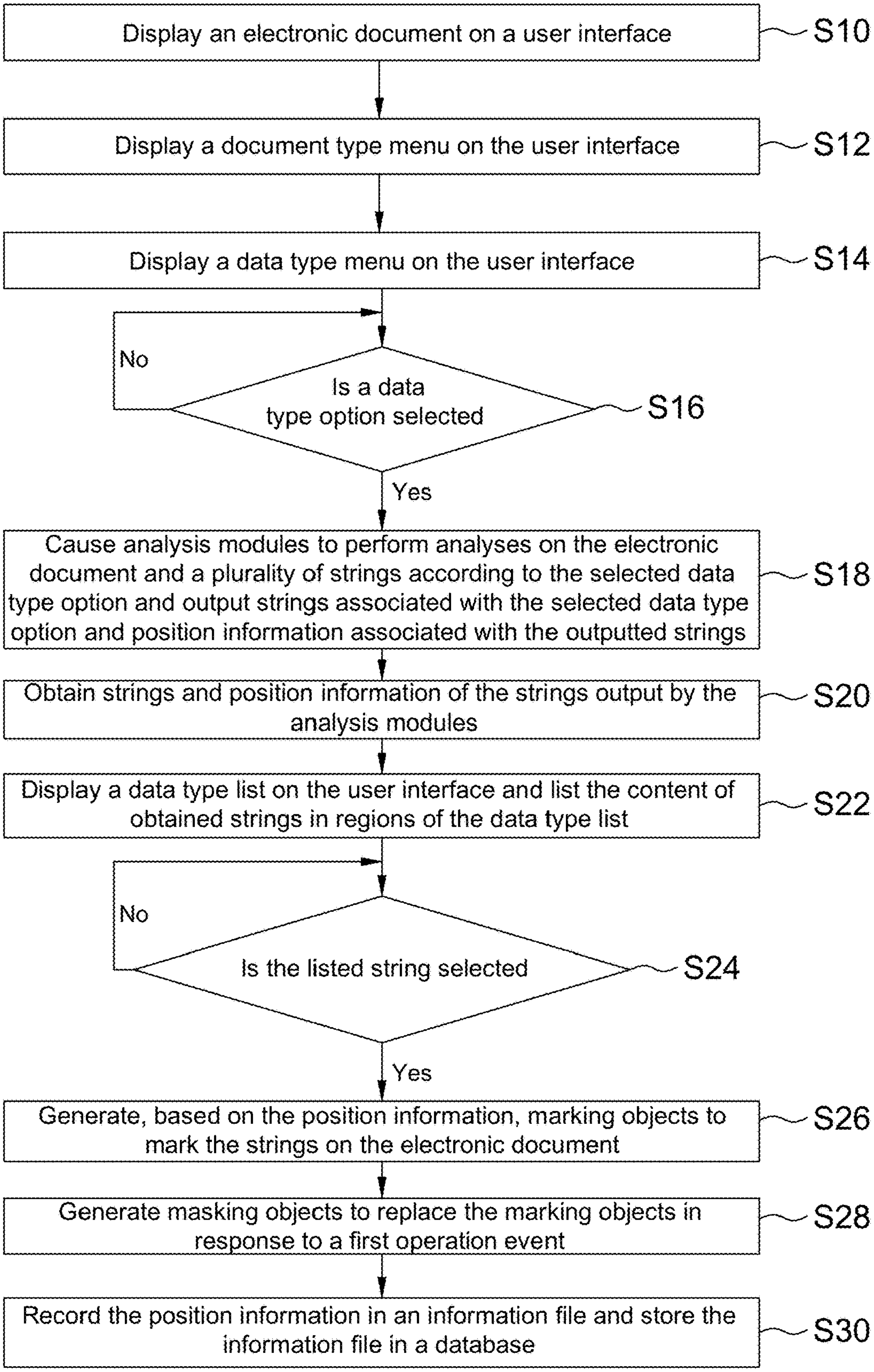
FIG. 4 is a flowchart of a method for masking data on an electronic document according to an embodiment of the present disclosure.

Now referring to FIG. 1, FIG. 3B, FIG. 3C, and FIG. 4, in the step S14, the processor 102 causes the display 104 to display a data type menu on the item selection region 208 of the user interface 200 for the user to select the data type to be masked. In the present embodiment, the data type menu includes a plurality of data type options, such as a "Select All" option 213, a "Name" option 214*a*, a "Phone No." option 214*b*, an "ID No." option 214*c*, an "Address" option 214*d*, a "Price" option 214*e*, and a "Date" option 214*f*. In the present embodiment, the page 2/2 of the electronic document 210 includes a plurality of strings "Article 8: XXX," "Article 9: XXX," "Lessor," "David Chen," "Tenant," "John Huang," "Telephone," "0983001333," "0977456078," "ID Number," "S381456745," and "N123456789," as shown in FIG. 3C. After causing the display 104 to display the data type menu on the item selection region 208 of the user interface 200, the processor 102 will perform the step S16.

In the step S16, the processor 102 detects whether a data type option is selected. In the present embodiment, when the confidential or sensitive information that the user would like to mask in the electronic document 210 includes names, phone numbers, and ID numbers, the user can use the first input device 108 or the second input device 110 to select the "Name" option 214*a*, the "Phone No." option 214*b*, and the "ID No." option 214*c*, thus causing the processor 102 to detect that the "Name" option 214*a*, the "Phone No." option 214*b*, and the "ID No." option 214*c* are selected. When the "Name" option 214*a*, the "Phone No." option 214*b*, and the "ID No." option 214*c* are selected, each of the check boxes of the "Name" option 214*a*, the "Phone No." option 214*b*, and the "ID No." option 214*c* will have a "V" appear to indicate that the "Name" option 214*a*, the "Phone No." option 214*b*, and the "ID No." option 214*c* have been selected. In addition, when the processor 102 does not detect any of the options 214*a* to 214*f* being selected, the processor 102 will repeat the step S16. Next, the user can use the first input device 108 or the second input device 110 to select a "Start Detection" button 216, thus causing the processor 102 to select, according to the control of the first input device 108 or the second input device 110, the "Start Detection" button 216 to start detecting the strings associated with "Name," "Phone No.," and "ID No." in the electronic document 210. After selecting the "Start Detection" button 216, the processor 102 will perform the step S18.

Referring to FIG. 1, FIG. 2, FIG. 3B, FIG. 3C, and FIG. 4, in the step S18, the processor 102 causes the first analysis module 140*a* of the first service server 140 and the second analysis module 150*a* of the second service server 150 to perform analyses on the electronic document 210 and a plurality of strings of the electronic document 210 according to the data type option selected in the step S16 and output strings associated with the selected data type option and position information associated with the outputted strings. In the present embodiment, the processor 102 transmits an analysis request and the electronic document 210 to the management server 120 after the "Start Detection" button 216 is selected. After receiving the analysis request, the management server 120 can generate a first command and a second command according to the analysis request. Afterwards, the management server 120 can transmit the first command and a plurality of strings of the electronic document 210 to the first service server 140, thus causing the first analysis module 140*a* to perform, in response to the first command generated according to the analysis request, a first analysis on the plurality of strings of the electronic document 210 and to identify, based on a first result of the first analysis, strings associated with "Name," "Phone No.," and "ID No." and then output these strings to the management server 120. The strings associated with "Name," "Phone No.," and "ID No." and identified by the first analysis module 140*a* include "David Chen," "John Huang," "0983001333," "0977456078," "S381456745," and "N123456789". In the present embodiment, the first result of the first analysis includes, for example, determining "David Chen" and "John Huang" as the data type "Name," determining "0983001333" and "0977456078" as the data type "Phone No.," and determining "S381456745" and "N123456789" as the data type "ID No." In addition, after receiving the strings "David Chen," "John Huang," "0983001333," "0977456078," "S381456745," and "N123456789," the management server 120 transmits these strings, the electronic document 210, and the second command to the second service server 150, thus causing the second analysis module 150*a* perform, in response to the second command generated according to the analysis request, a second analysis on positions where the received strings are located on the electronic document 210 and to output, based on a second result of the second analysis, position information associated with the strings "David Chen," "John Huang," "0983001333," "0977456078," "S381456745," and "N123456789" to the management server 120. After receiving the strings "David Chen," "John Huang," "0983001333," "0977456078," "S381456745," and "N123456789" from the first analysis module 140*a* and receiving the position information associated with these strings, the management server 120 transmits these strings and the position information associated with these strings to the electronic apparatus 100.

In the present embodiment, the position information associated with each string outputted by the second analysis module 150*a* may include at least one coordinate, a width value and a height value. The at least one coordinate is used to indicate a position where a corresponding string is located on the electronic document 210 and can be represented, for example, by (x, y) coordinates. The width value and the height value are used to respectively indicate a width and a height of the corresponding string in the electronic document 210, and the length unit of the width value and the length unit of the height value may be defined according to different requirements. For example, the length unit may be the number of characters, the number of letters, the ratio of the width of the electronic document to the width of the string, or the ratio of the height of the electronic document to the height of the string but is not limited thereto. In another embodiment, the position information may further include a page number to indicate a number of the page on which a corresponding string is located on the electronic document 210. In one embodiment of the present disclosure, before transmitting the strings "David Chen," "John Huang," "0983001333," "0977456078," "S381456745," and "N123456789" and the position information associated with these strings to the electronic apparatus 100, the management server 120 organizes and arranges these strings and the position information. For example, the management server 120 may arrange these strings and the position information into multiple data records shown in Table 1 below according to numbers and transmit each data record to the electronic apparatus 100 according to the numbering sequence shown in Table 1. In another embodiment of the present disclosure, the management server 120 may store the multiple data records shown in Table 1 below into an information file and transmit the information file to the electronic apparatus 100.

TABLE 1

| Serial No. | Data Type | String Content | Page No. | Position coordinates | String Height | String Width |
|---|---|---|---|---|---|---|
| 1 | Name | David Chen | 1/2 | (X1, Y1) | 1 | 3 |
| 2 | Name | John Huang | 1/2 | (X2, Y2) | 1 | 3 |
| 3 | Name | David Chen | 2/2 | (X3, Y3) | 1 | 3 |
| 4 | Name | John Huang | 2/2 | (X4, Y4) | 1 | 3 |
| 5 | Phone No. | 0983001333 | 2/2 | (X5, Y5) | 1 | 10 |
| 6 | Phone No. | 0977456078 | 2/2 | (X6, Y6) | 1 | 10 |
| 7 | ID No. | S381456745 | 2/2 | (X7, Y7) | 1 | 10 |
| 8 | ID No. | N123456789 | 2/2 | (X8, Y8) | 1 | 10 |

In the step S20, the processor 102 receives the eight data records as listed in Table 1 from the management server 120 to obtain the strings associated with "Name," "Phone No.," and "ID No." output by the first analysis module 140*a* and the position information of the strings output by the second analysis module 150*a*. In the present embodiment, each data record may include a data number, a data type, a string content, a page number, position coordinates, a string height and/or a string width, but is not limited thereto. In other embodiments, each data record may further include a data creation date, a data modification date, and/or the name of a person who modified the data. After obtaining the strings associated with "Name," "Phone No." and "ID No." and the position information of the strings, the processor 102 will perform the step S22.

Referring to FIG. 1, FIG. 3D, FIG. 3E, and FIG. 4, in the step S22, the processor 102 obtains the strings associated with "Name," "Phone No.," and "ID No." and causes the display 104 to display a data type list on the item selection region 208 of the user interface 200 and to list contents of the obtained strings in different regions of the data type list. In the present embodiment, the data type list includes a status display region 218 and a plurality of selectable regions 219 to 227. The status display region 218 is configured to indicate the number of the detected strings that match the selected data type. The selectable regions 219 to 227 respectively include a plurality of check boxes 219*a* to 227*a* used to indicate whether the data type options associated with the selectable regions 219 to 227 are selected. Specifically, the data type associated with the selectable regions 219 to 221 is "Name," so the processor 102 can list the string contents "David Chen" and "John Huang", which are identified as or associated with the data type "Name", respectively in the selectable region 220 and the selectable region 221. The data type associated with the selectable regions 222 to 224 is "Phone No." (or "telephone number"), so the processor 102 can list the string contents "0983001333" and "0977456078", which are identified as or associated with the data type "Phone No.", respectively in the selectable region 223 and the selectable region 224. The data type associated with the selectable regions 225 to 227 is "ID No.", so the processor 102 can list the string contents "S381456745" and "N123456789", which are identified as or associated with the data type "ID No.", respectively in the selectable region 226 and the selectable region 227. After causing the display 104 to display the data type list, the processor 102 will perform the step S24.

Now referring to FIG. 1, FIG. 3F, FIG. 3H, and FIG. 4, in the step S24, the processor 102 detects whether the string content listed in the selectable regions 219 to 227 is selected. In the present embodiment, when the user finally decides that the confidential information or sensitive information to be masked is the strings associated with "Phone No." and "ID No.," the user can use the first input device 108 or the second input device 110 to select the strings "0983001333" and "0977456078" listed in the selectable regions 223 and 224 and the strings "S381456745" and "N123456789" listed in the selectable regions 226 and 227, thus causing the processor 102 to detect that the strings listed in the selectable regions 223, 224, 226, and 227 are selected. After the strings "0983001333," "0977456078," "S381456745," and "N123456789" listed in the selectable regions 223, 224, 226, and 227 are selected, the check boxes 223*a*, 224*a*, 226*a*, and 227*a* of the selectable regions 223, 224, 226, and 227 will appear "V" to indicate that the strings listed in the selectable regions 223, 224, 226, and 227 have been selected. In addition, when the processor 102 does not detect any string content listed in the selectable regions 219 to 227 being selected, the processor 102 will repeat the step S24. In the present embodiment, when the data type "Name" listed in the selectable region 219 is selected to cause the check box 219*a* to appear "V", the strings "David Chen" and "John Huang" listed in the selectable regions 220 and 221 will be automatically selected, and the check boxes 220*a* and 221*a* will automatically appear "V" to indicate that the strings "David Chen" and "John Huang" listed in the selectable regions 220 and 221 have been selected. When the data type "Phone No." listed in the selectable region 222 is selected to cause the check box 222*a* to appear "V", the strings "0983001333" and "0977456078" listed in the selectable regions 223 and 224 will be automatically selected, and the check boxes 223*a* and 224*a* will automatically appear "V" to indicate that the strings "0983001333" and "0977456078" listed in the selectable regions 223 and 224 have been selected. When the data type "ID No." listed in the selectable region 225 is selected to cause the check box 225*a* to appear "V", the strings "S381456745" and "N123456789" listed in the selectable regions 226 and 227 will be automatically selected, and the check boxes 226*a* and 227*a* will automatically appear "V" to indicate that the strings "S381456745" and "N123456789" listed in the selectable regions 226 and 227 have been selected. After detecting that the string content listed in the selectable regions 223, 224, 226, and 227 is selected, the processor 102 will perform the step S26.

Figure 3G:
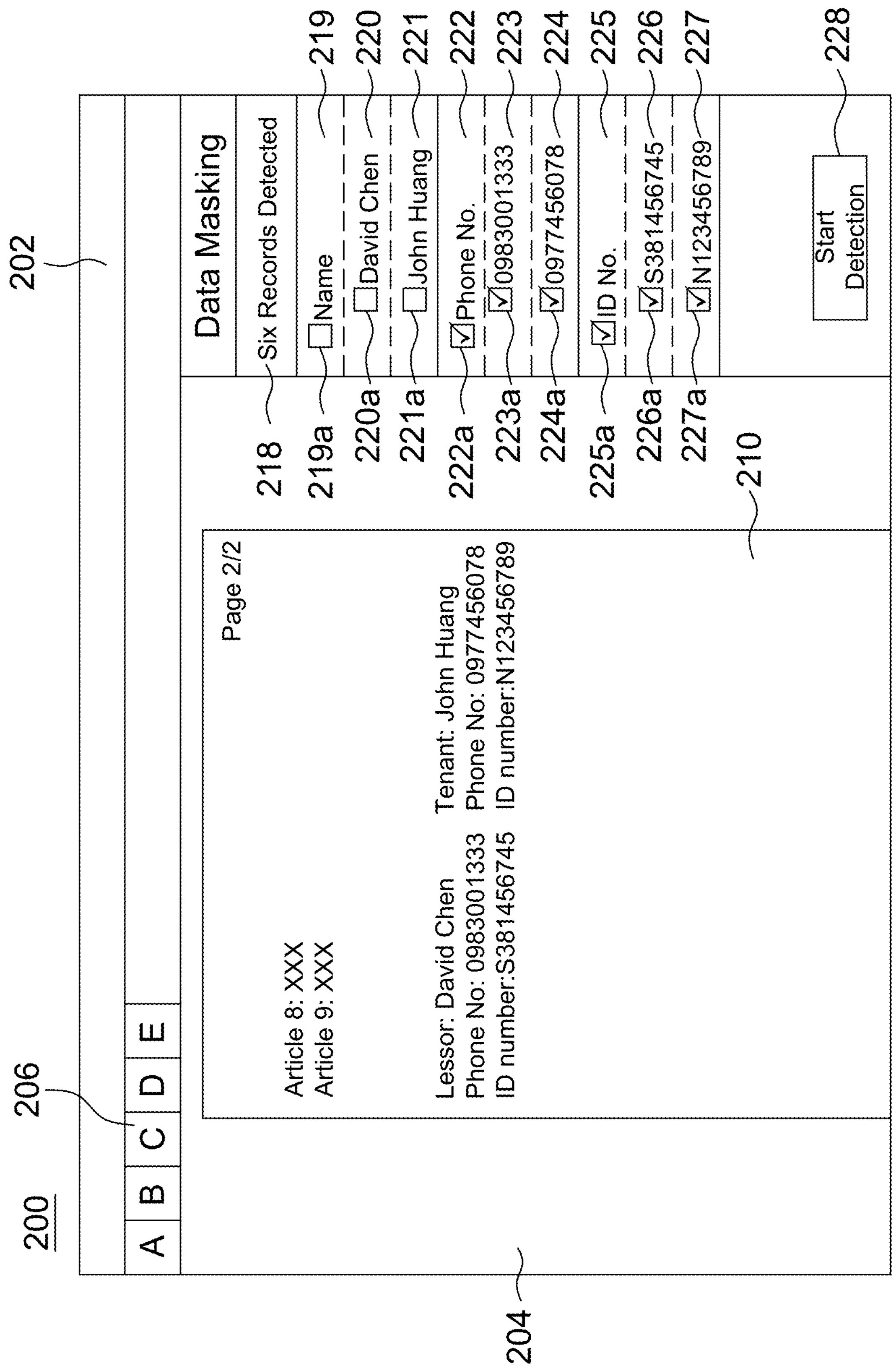
Figure 3H:
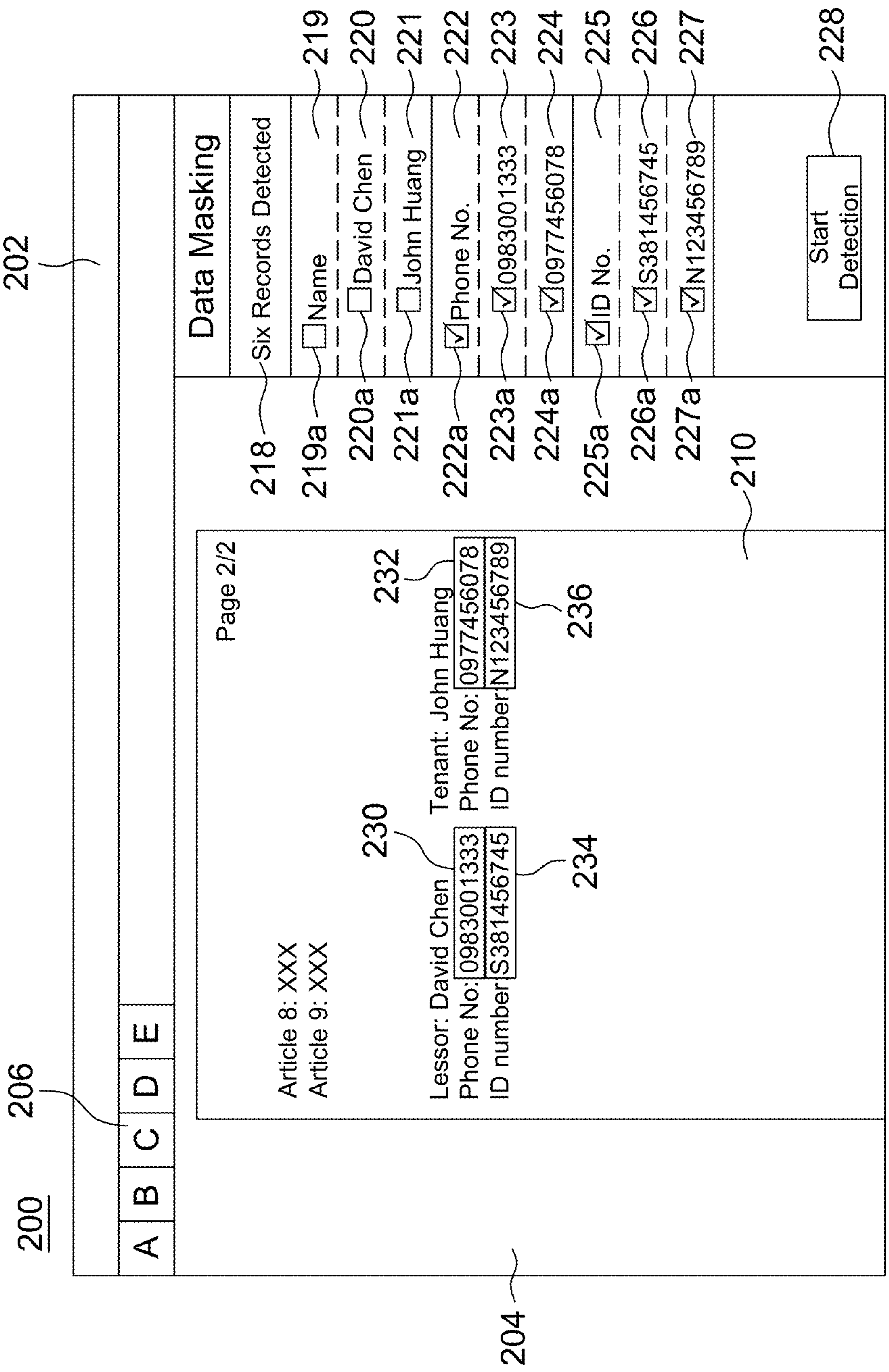

In the step S26, after detecting that the string content listed in the selectable regions 223, 224, 226, and 227 is selected, the processor 102 generates, based on the position information obtained in the step S20, marking objects 230, 232, 234, and 236 to mark the strings "0983001333," "0977456078," "S381456745," and "N123456789" on the electronic document 210 as shown in FIG. 3H. In the present embodiment, after detecting that the string contents listed in the selectable regions 223, 224, 226, and 227 are selected, the processor 102 generates the marking objects 230, 232, 234, and 236 based on the position information of the strings "0983001333," "0977456078," "S381456745," and "N123456789." In the present embodiment, the position information of the string "0983001333" includes position coordinates (X5, Y5), a string height with a length unit of 1, and a string width with a length unit of 10. The position information of the string "0977456078" includes position coordinates (X6, Y6), a string height with a length unit of 1, and a string width with a length unit of 10. The position information of the string "S381456745" includes position coordinates (X7, Y7), a string height with a length unit of 1, and a string width with a length unit of 10. The position information of the string "N123456789" includes position coordinates (X8, Y8), a string height with a length unit of 1, and a string width with a length unit of 10. In addition, after generating the marking objects 230, 232, 234, and 236 to mark the strings "0983001333," "0977456078," "S381456745," and "N123456789" on the electronic document 210 (as shown in FIG. 3H), the processor 102 may further detect whether the string content listed in the selectable regions 223, 224, 226, and 227 is selected again. After the processor 102 detects that the string content listed in the selectable regions 222, 223, 224, 225, 226, and 227 is selected again, "V" appearing in the check boxes 222*a*, 223*a*, 224*a*, 225*a*, 226*a*, and 227*a* will automatically disappear, and the marking objects 230, 232, 234, and 236 marked on the strings "0983001333," "0977456078," "S381456745," and "N123456789" will also be automatically removed accordingly.

In an alternative embodiment of the present disclosure, after detecting that the string content listed in the selectable regions 223, 224, 226, 227 is selected, the processor 102 may not generate the marking objects 230, 232, 234, and 236, as shown in FIG. 3G. In addition, it should be noted that the marking objects 230, 232, 234, and 236 are mainly used to mark the strings "0983001333," "0977456078," "S381456745," and "N123456789" to allow the user to preview the strings that will be masked. Therefore, the marking objects 230, 232, 234, and 236 can be any objects that can mark the strings, such as transparent color blocks, symbols or patterns, etc., and are not limited to the rectangular boxes disclosed in the present embodiment. After generating the marker objects 230, 232, 234, and 236, the processor 102 will perform the step S28.

Figure 3I:
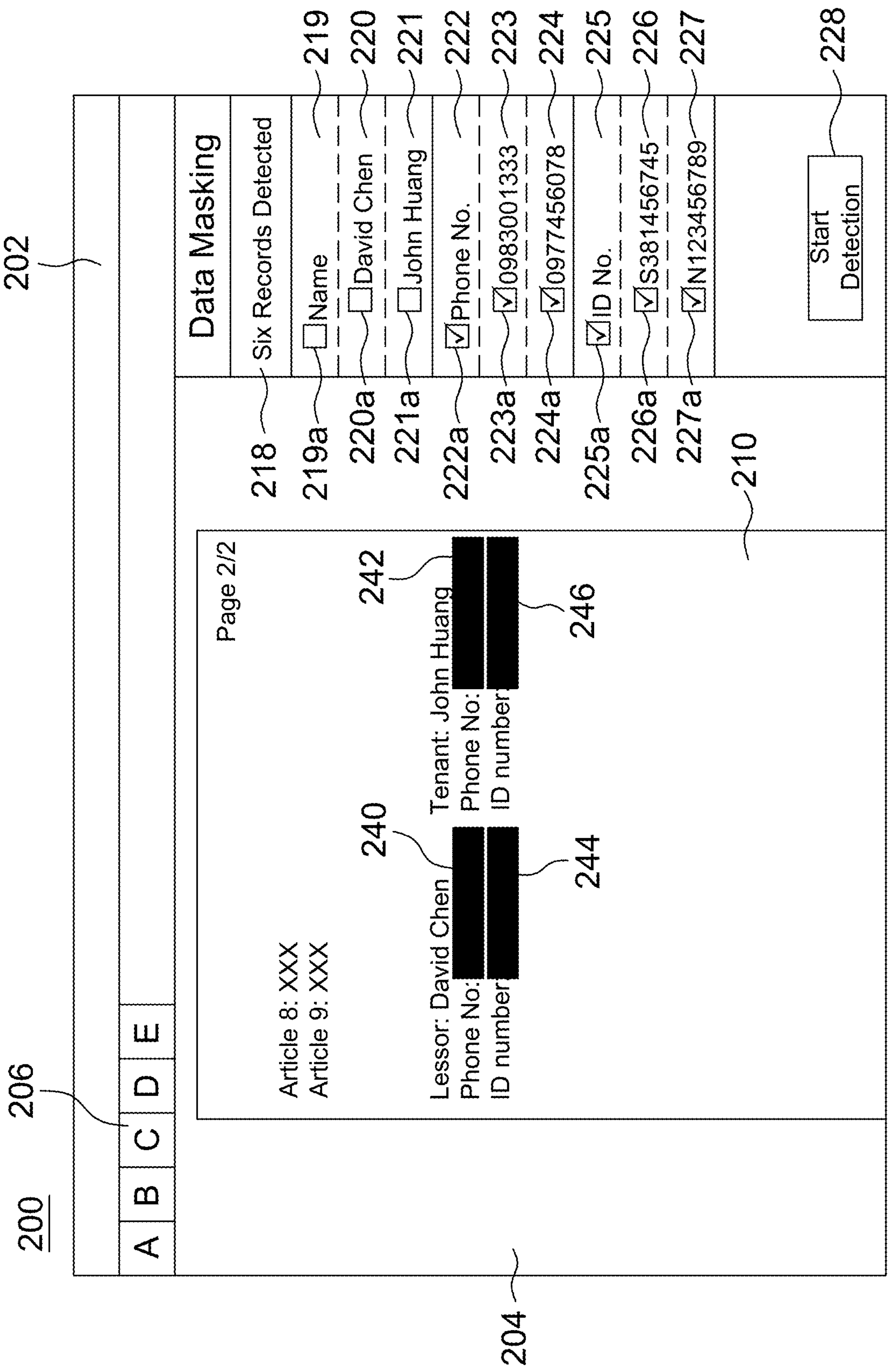

Now referring to FIG. 1, FIG. 3H, FIG. 3I, and FIG. 4, in the step S28, the processor 102 generates masking objects 240, 242, 244, 246 to replace the marking objects 230, 232, 234, and 236 in response to a first operation event, thus masking the strings "0983001333," "0977456078," "S381456745," and "N123456789" on the electronic document 210 as shown in FIG. 3I. In the present embodiment, the first operation event may be that a "Start Masking" button 228 is selected. Specifically, the user can use the first input device 108 or the second input device 110 to select the "Start Masking" button 228, thus causing the processor 102 to select the "Start Masking" button 228 according to the control of the first input device 108 or the second input device 110 to generate the masking objects 240, 242, 244, and 246 to replace the marking objects 230, 232, 234, and 236, thereby masking the strings "0983001333," "0977456078," "S381456745," and "N123456789" on the electronic document 210. In an alternative embodiment, the first operation event may be that the "Save File" option B is selected. Specifically, the user can use the first input device 108 or the second input device 110 to select the "Save File" option B, thus causing the processor 102 to select the "Save File" option B according to the control of the first input device 108 or the second input device 110 to generate the masking objects 240, 242, 244, and 246 to replace the marking objects 230, 232, 234, and 236, thereby masking the strings "0983001333," "0977456078," "S381456745," and "N123456789" on the electronic document 210. In another embodiment, in a case that the processor 102 does not generate the marking objects 230, 232, 234, and 236 (as shown in FIG. 3G), the user can use the first input device 108 or the second input device 110 to select the "Start Masking" button 228 shown in FIG. 3G, thus causing the processor 102 to select the "Start Masking" button 228 according to the control of the first input device 108 or the second input device 110. After selecting the "Start Masking" button 228, the processor 102 generates, based on the position information (e.g., the position information of the strings "0983001333," "0977456078," "S381456745," and "N123456789") obtained in step S20, the masking objects 240, 242, 244, and 246 to mask the strings "0983001333," "0977456078," "S381456745," and "N123456789" as shown in FIG. 3I. In other embodiment, in a case that the processor 102 does not generate the marking objects 230, 232, 234, and 236 (as shown in FIG. 3G), the user can use the first input device 108 or the second input device 110 to select the "Save File" option B shown in FIG. 3G, thus causing the processor 102 to select the "Save File" option B according to the control of the first input device 108 or the second input device 110. After selecting the "Save File" option B, the processor 102 generates, based on the position information (e.g., the position information of the strings "0983001333," "0977456078," "S381456745," and "N123456789") obtained in step S20, the masking objects 240, 242, 244, and 246 to mask the strings "0983001333," "0977456078," "S381456745," and "N123456789" as shown in FIG. 3I. After generating the masking objects 240, 242, 244, and 246, the processor 102 will perform the step S30.

In the above embodiments, the electronic document 210 may be, for example, an electronic document in PDF format. In addition, after the masking objects 240, 242, 244, and 246 mask the strings "0983001333," "0977456078," "S381456745," and "N123456789" on the electronic document 210, a PDF flattening technology can be used to flatten the masking objects 240, 242, 244, and 246 and the strings "0983001333," "0977456078," "S381456745," and "N123456789" into the same layer, thus making the strings "0983001333," "0977456078," "S381456745," and "N123456789" non-editable or non-searchable thereafter to enhance the masking and confidentiality effect.

Now referring to FIG. 1, FIG. 2, FIG. 3I, and FIG. 4, in the step S30, the processor 102 records, in response to a second operation event, the position information of the masked string contents "0983001333," "0977456078," "S381456745," and "N123456789" in an information file and stores the information file in a database. In the present embodiment, the information file is independent from the electronic document 210. In addition, the second operation event may be that the "Save File" option B is selected. Specifically, the user can use the first input device 108 or the second input device 110 to select the "Save File" option B, thus causing the processor 102 to select the "Save File" option B according to the control of the first input device 108 or the second input device 110 to record the position information of the masked string contents "0983001333," "0977456078," "S381456745," and "N123456789" in an information file and store the information file in a database. In the present embodiment, the database may be the database 130 or may be provided in the storage 106 of the electronic apparatus 100.

It should be noted that, in the above embodiments, the masking objects 240, 242, 244, and 246 shown in FIG. 3I are rectangular black blocks but are not limited thereto. In other embodiments, the masking objects 240, 242, 244, 246 may be blocks of other colors or shapes or may be symbols or patterns. In another embodiment, the masking objects 240, 242, 244, and 246 can only mask at least one portion of the characters or letters of the confidential information or sensitive information, thus also achieving the objective of masking data.

The present disclosure also provides a non-transitory computer readable medium that stores a plurality of computer-executable instructions. The plurality of computer-executable instructions, when executed by one or more processors, cause an electronic apparatus (e.g., the electronic apparatus 100 shown in FIG. 1) to perform the method for masking data on an electronic document as described in the above embodiment. In one embodiment of the present disclosure, the non-transitory computer readable medium may be, for example, a hard disk, an optical disc, a universal serial bus (USB) flash drive, a solid-state drive (SSD), etc., but is not limited thereto.

Although the present disclosure has been disclosed by way of above embodiments, the embodiments are not intended to limit the present disclosure, and those skilled in the art will appreciate that changes and modifications may be made therein as long as those changes and modifications do not deviate from the spirit and the scope of the present disclosure. Therefore, the scope of the present disclosure should be construed according to the definitions in the appended claims.

What is claimed is:

1. A method for masking data on an electronic document, the method being performed by an electronic apparatus and comprising:

displaying the electronic document on a user interface, wherein the electronic document comprises a plurality of strings and the plurality of strings comprises a first string and a second string;

displaying a data type menu on the user interface, wherein the data type menu includes a first data type option and a second data type option, and the first data type option and the second data type option are respectively associated with a first data type and a second data type;

detecting whether the first data type option is selected;

after detecting that the first data type option is selected, causing at least one analysis module to perform at least one analysis on the electronic document and the plurality of strings based on the first data type and, according to at least one result of the at least one analysis, identify the first string associated with the first data type and output the first string and first position information associated with the first string;

obtaining the first string and the first position information from the at least one analysis module;

displaying a data type list on the user interface after obtaining the first string and the first position information from the at least one analysis module, wherein the data type list includes a first region;

listing the first string associated with the first data type on the first region;

detecting whether the first string listed in the first region is selected; and after detecting that the first string listed on the first region is selected, generating, based on the obtained first position information and the obtained first string, a first masking object to mask at least one portion of the first string on the electronic document.

2. The method of claim 1, further comprising:

detecting whether the second data type option is selected;

after detecting that the second data type option is selected, causing the at least one analysis module to perform the at least one analysis on the electronic document and the plurality of strings based on the second data type and, according to the at least one result of the at least one analysis, identify the second string associated with the second data type and output the second string and second position information associated with the second string;

obtaining the second string and the second position information from the at least one analysis module;

displaying the data type list on the user interface after obtaining the second string and the second position information from the at least one analysis module, wherein the data type list includes a second region;

listing the second string associated with the second data type on the second region;

detecting whether the second string listed in the second region is selected; and after detecting that the second string listed on the second region is selected, generating, based on the obtained second position information and the obtained second string, a second masking object to mask at least one portion of the second string on the electronic document.

3. The method of claim 2, wherein:

the first position information includes at least one first position coordinate to indicate a first position where the first string is located on the electronic document, and the second position information includes at least one second position coordinate to indicate a second position where the second string is located on the electronic document.

4. The method of claim 3, wherein:

the first position information further includes a first width value and a first height value for respectively indicating a first width and a first height of the first string on the electronic document; and the second position information further includes a second width value and a second height value for respectively indicating a second width and a second height of the second string on the electronic document.

5. The method of claim 2, wherein:

the at least one result of the at least one analysis comprises that the first string is determined as the first data type and that the second string is determined as the second data type.

6. The method of claim 2, further comprising:

generating, based on the obtained first position information, a first marking object to mark at least one portion of the first string on the electronic document after detecting that the first string listed on the first region is selected and before generating the first masking object; and wherein generating the first masking object further comprises:

generating, in response to a first operation event, the first masking object to replace the first marking object to mask the at least one portion of the first string on the electronic document.

7. The method of claim 6, further comprising:

recording, in response to a second operation event, the first position information and the second position information in an information file and storing the information file in a database, wherein the information file is independent from the electronic document.

8. The method of claim 6, further comprising:

detecting whether the first string listed in the first region is selected after generating the first masking object; and removing the first marking object after the first string listed in the first region is selected.

9. The method of claim 2, wherein:

the at least one analysis module is provided in at least one server;

the at least one analysis includes a first analysis and a second analysis; and the method further comprises:

transmitting an analysis request and the electronic document to the at least one server;

causing the at least one analysis module to perform, in response to the analysis request, the first analysis on the plurality of strings of the electronic document and output the first string and the second string according to a first result of the first analysis;

causing the at least one analysis module to perform, in response to the analysis request, the second analysis on positions where the first string and the second string are located on the electronic document and output the first position information and the second position information according to a second result of the second analysis; and receiving the first string, the second string, the first position information and the second position information from the at least one server to obtain the first string, the second string, the first position information and the second position information.

10. An electronic apparatus for masking data on an electronic document, comprising:

a processor;

a display electrically coupled to the processor; and a storage electrically coupled to the processor and configured to store a plurality of computer-executable instructions, wherein the plurality of computer-executable instructions, when executed by the processor, cause the electronic apparatus to perform:

displaying the electronic document on a user interface on the display, wherein the electronic document comprises a plurality of strings and the plurality of strings comprises a first string and a second string;

displaying a data type menu on the user interface, wherein the data type menu includes a first data type option and a second data type option, and the first data type option and the second data type option are respectively associated with a first data type and a second data type detecting whether the first data type option is selected;

after detecting that the first data type option is selected, causing at least one analysis module to perform at least one analysis on the electronic document and the plurality of strings based on the first data type and, according to the at least one result of the at least one analysis, identify the first string associated with the first data type and output the first string and first position information associated with the first string;

obtaining the first string and the first position information from the at least one analysis module;

displaying a data type list on the user interface after obtaining the first string and the first position information from the at least one analysis module, wherein the data type list includes a first region;

listing the first string associated with the first data type on the first region; and after detecting that the first string listed on the first region is selected, generating, based on the obtained first position information and the obtained first string, a first masking object to mask at least one portion of the first string on the electronic document.

11. The electronic apparatus of claim 10, wherein the plurality of computer-executable instructions further cause the electronic apparatus to perform:

detecting whether the second data type option is selected;

after detecting that the second data type option is selected, causing the at least one analysis module to perform the at least one analysis on the electronic document and the plurality of strings based on the second data type and, according to the at least one result of the at least one analysis, identify the second string associated with the second data type and output the second string and second position information associated with the second string;

obtaining the second string and the second position information from the at least one analysis module;

displaying the data type list on the user interface after obtaining the second string and the second position information from the at least one analysis module, wherein the data type list includes a second region;

listing the second string associated with the second data type on the second region;

detecting whether the second string listed in the second region is selected; and after detecting that the second string listed on the second region is selected, generating, based on the obtained second position information and the obtained second string, a second masking object to mask at least one portion of the second string on the electronic document.

12. The electronic apparatus of claim 11, wherein:

the at least one result of the at least one analysis comprises that the first string is determined as the first data type and that the second string is determined as the second data type.

13. The electronic apparatus of claim 11, wherein the plurality of computer-executable instructions further cause the electronic apparatus to perform:

generating, based on the obtained first position information, a first marking object to mark at least one portion of the first string on the electronic document after detecting that the first string listed on the first region is selected and before generating the first masking object; and wherein generating the first masking object further comprises:

generating, in response to a first operation event, the first masking object to replace the first marking object to mask the at least one portion of the first string on the electronic document.

14. The electronic apparatus of claim 11, wherein the plurality of computer-executable instructions further cause the electronic apparatus to perform:

detecting whether the first string listed in the first region is selected after generating the first masking object; and removing the first marking object after the first string listed in the first region is selected.

15. The electronic apparatus of claim 11, wherein:

the at least one analysis module is provided in at least one server;

the at least one analysis includes a first analysis and a second analysis; and the plurality of computer-executable instructions further cause the electronic apparatus to perform:

transmitting an analysis request and the electronic document to the at least one server;

causing the at least one analysis module to perform, in response to the analysis request, the first analysis on the plurality of strings of the electronic document and output the first string and the second string according to a first result of the first analysis;

causing the at least one analysis module to perform, in response to the analysis request, the second analysis on positions where the first string and the second string are located on the electronic document and output the first position information and the second position information according to a second result of the second analysis; and receiving the first string, the second string, the first position information and the second position information from the at least one server to obtain the first string, the second string, the first position information and the second position information.

16. A non-transitory computer readable medium that stores a plurality of computer-executable instructions, wherein the plurality of computer-executable instructions, when executed by one or more one processors, cause an electronic apparatus to perform:

displaying an electronic document on a user interface, wherein the electronic document comprises a plurality of strings and the plurality of strings comprises a first string and a second string;

displaying a data type menu on the user interface, wherein the data type menu includes a first data type option and a second data type option, and the first data type option and the second data type option are respectively associated with a first data type and a second data type;

detecting whether the first data type option is selected;

after detecting that the first data type option is selected, causing at least one analysis module to perform at least one analysis on the electronic document and the plurality of strings based on the first data type and, according to at least one result of the at least one analysis, identify the first string associated with the first data type and output the first string and first position information associated with the first string;

obtaining the first string and the first position information from the at least one analysis module;

displaying a data type list on the user interface after obtaining the first string and the first position information from the at least one analysis module, wherein the data type list includes a first region;

listing the first string associated with the first data type on the first region;

detecting whether the first string listed in the first region is selected;

after detecting that the first string listed on the first region is selected, generating, based on the obtained first position information and the obtained first string, a first masking object to mask at least one portion of the first string on the electronic document.

17. The non-transitory computer readable medium of claim 16, wherein the plurality of computer-executable instructions further cause the electronic apparatus to perform:

detecting whether the second data type option is selected;

after detecting that the second data type option is selected, causing the at least one analysis module to perform the at least one analysis on the electronic document and the plurality of strings based on the second data type and, according to the at least one result of the at least one analysis, identify the second string associated with the second data type and output the second string and second position information associated with the second string;

obtaining the second string and the second position information from the at least one analysis module;

displaying the data type list on the user interface after obtaining the second string and the second position information from the at least one analysis module, wherein the data type list includes a second region; listing the second string on the second region associated with the second data type;

detecting whether the second string listed in the second region is selected;

after detecting that the second string listed on the second region is selected, generating, based on the obtained second position information and the obtained second string, a second masking object to mask at least one portion of the second string on the electronic document.

18. The non-transitory computer readable medium of claim 17, wherein the plurality of computer-executable instructions further cause the electronic apparatus to perform:

generating, based on the obtained first position information, a first marking object to mark at least one portion of the first string on the electronic document after detecting that the first string listed on the first region is selected and before generating the first masking object; and wherein generating the first masking object further comprises:

generating, in response to a first operation event, the first masking object to replace the first marking object to mask the at least one portion of the first string on the electronic document.

* * * * *